US012620275B2

(12) United States Patent
Hara et al.

(10) Patent No.: US 12,620,275 B2
(45) Date of Patent: May 5, 2026

(54) APPARATUS FOR RECORDING AND/OR DISPLAYING STATE OF MOVING OBJECT

(71) Applicant: HONDA MOTOR CO., LTD., Tokyo (JP)

(72) Inventors: Yuki Hara, Tokyo (JP); Steven Andrew Stemmer, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 18/426,393

(22) Filed: Jan. 30, 2024

(65) Prior Publication Data

US 2025/0246031 A1 Jul. 31, 2025

(51) Int. Cl.
*G07C 5/06* (2006.01)

(52) U.S. Cl.
CPC .................................... *G07C 5/06* (2013.01)

(58) Field of Classification Search
CPC ........................................................ G07C 5/06
See application file for complete search history.

(56) References Cited

U.S. PATENT DOCUMENTS

| | | | | |
|---|---|---|---|---|
| 11,089,239 | B1 * | 8/2021 | Murad | H04N 7/181 |
| 11,285,773 | B1 * | 3/2022 | Hall | B60G 17/06 |
| 11,823,368 | B1 * | 11/2023 | Mohammad | G06T 7/0004 |
| 12,060,003 | B2 * | 8/2024 | Whitehouse | G01S 15/04 |
| 2014/0156134 | A1 * | 6/2014 | Cullinane | G05D 1/0223 701/23 |
| 2017/0010618 | A1 * | 1/2017 | Shashua | G01C 21/3644 |
| 2017/0365169 | A1 * | 12/2017 | Tennent | G06Q 10/06 |
| 2019/0049958 | A1 * | 2/2019 | Liu | G01S 17/00 |
| 2020/0023772 | A1 * | 1/2020 | Kurnaz | G06T 5/90 |
| 2021/0094537 | A1 * | 4/2021 | Mahnken | B60W 10/184 |
| 2022/0242401 | A1 * | 8/2022 | Thompson | G06F 1/14 |
| 2022/0242422 | A1 * | 8/2022 | Thompson | B60W 30/09 |
| 2022/0242441 | A1 * | 8/2022 | Thompson | G06V 10/774 |
| 2023/0249617 | A1 * | 8/2023 | Whitehouse | G01S 15/931 340/435 |
| 2023/0328315 | A1 * | 10/2023 | Lei | G01C 21/3605 |
| 2024/0345216 | A1 * | 10/2024 | Tzagkas | G01S 7/4026 |

FOREIGN PATENT DOCUMENTS

| | | |
|---|---|---|
| JP | 3514236 B2 | 3/2004 |
| JP | 2011-028651 A | 2/2011 |

* cited by examiner

*Primary Examiner* — Tyler J Lee
(74) *Attorney, Agent, or Firm* — Paratus Law Group, PLLC

(57) ABSTRACT

An apparatus for recording and/or displaying a state of a moving object includes: an information acquisition unit that acquires information regarding a surrounding environment of the moving object; a behavior acquisition unit that acquires a behavior during movement of the moving object; and a processing circuit, in which the processing circuit determines an environment where the moving object is positioned based on the information acquired by the information acquisition unit, and record and/or display the state of the moving object when the determined environment is a predetermined environment and the behavior acquired by the behavior acquisition unit satisfies a predetermined condition.

18 Claims, 7 Drawing Sheets

APPARATUS FOR RECORDING AND/OR DISPLAYING STATE OF MOVING OBJECT

TECHNICAL FIELD

The present disclosure relates to an apparatus for recording and/or displaying a state of a moving object.

BACKGROUND ART

Recently, efforts have been actively made to provide access to a sustainable transportation system considering vulnerable traffic participants. As one of such efforts, research and development relating to a driving assistance technology and an automated driving technology for moving objects (for example, vehicles such as automobiles) has been made to further improve safety and convenience of traffic.

For example, a vehicle video recording apparatus described in JP2011-28651A includes a camera and a control unit configured to record a video acquired by the camera in a memory. The control unit executes the recording process under a preset condition such as places that attract attention. Examples of the places that attract attention include tourist sites, sights, historic spots, and beautiful places.

A video/audio automatic editing apparatus described in JP3514236B records brain waves in synchronization with a video and a sound. Using the recorded brain waves, only videos of interest to a user are automatically extracted from past-experience videos of the user.

In the vehicle video recording apparatus described in JP2011-28651A, under the predetermined condition, for example, videos can be automatically recorded in the places such as tourist sites, sights, historic spots, and beautiful places. However, only videos of interest to the user cannot be automatically extracted from the videos recorded in the above-described environments.

In the video/audio automatic editing apparatus described in JP3514236B, only videos of interest to the user can be automatically extracted. However, to record the brain waves of the user, the user needs to wear an electroencephalogram, and there is room for improvement from the viewpoints of convenience or cost.

One aspect of the present disclosure provides an apparatus capable of recording and/or displaying a state of a moving object of interest to a user. The safety of traffic is further improved, which contributes to the development of a sustainable transportation system.

SUMMARY OF INVENTION

According to an aspect of the present disclosure, there is provided an apparatus for recording and/or displaying a state of a moving object includes: an information acquisition unit that acquires information regarding a surrounding environment of the moving object; a behavior acquisition unit that acquires a behavior during movement of the moving object; and a processing circuit, in which the processing circuit determines an environment where the moving object is positioned based on the information acquired by the information acquisition unit, and record and/or display the state of the moving object when the determined environment is a predetermined environment and the behavior acquired by the behavior acquisition unit satisfies a predetermined condition.

DESCRIPTION OF EMBODIMENTS

Figure 1:
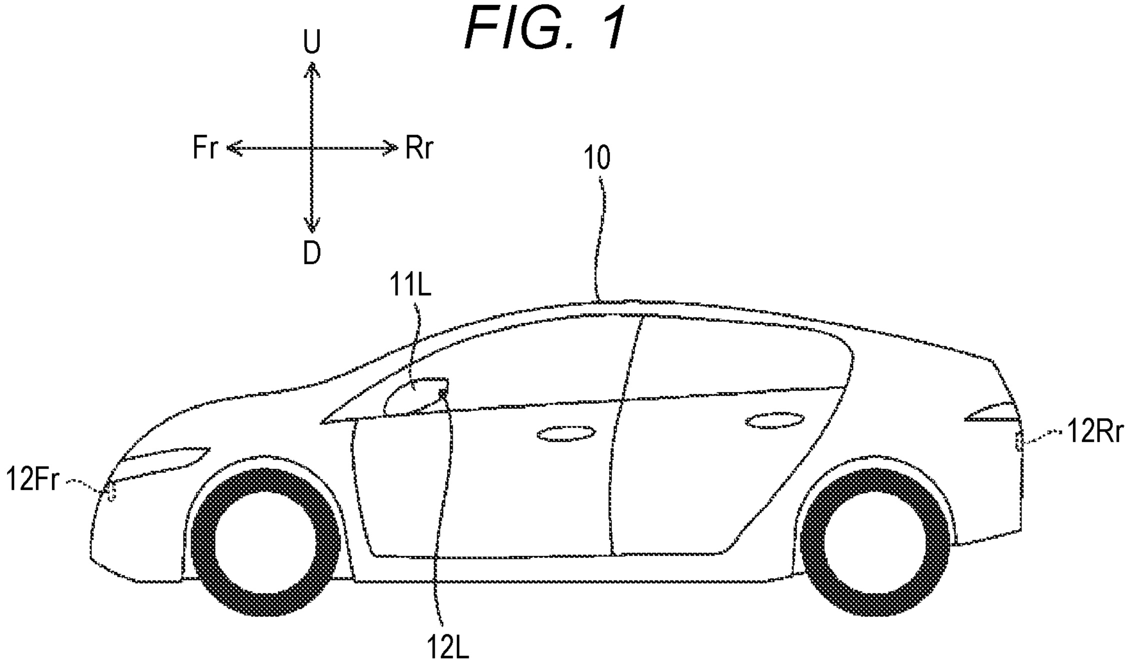
FIG. 1 is a side view illustrating an example of a moving object.

Hereinafter, an embodiment of the present disclosure will be described based on the accompanying drawings. Note that the drawings are seen such that reference numerals look properly oriented. In the present disclosure, to simplify and clarify the description, each of front and rear, left and right, and upward and downward directions will be described based on a direction seen from a user (for example, a driver) of a vehicle 10 illustrated in FIG. 1, and a front side, a rear side, a left side, a right side, an upward side, and a downward side of the vehicle 10 will be represented by Fr, Rr, L, R, U, and D, respectively in the drawings.

Figure 2:
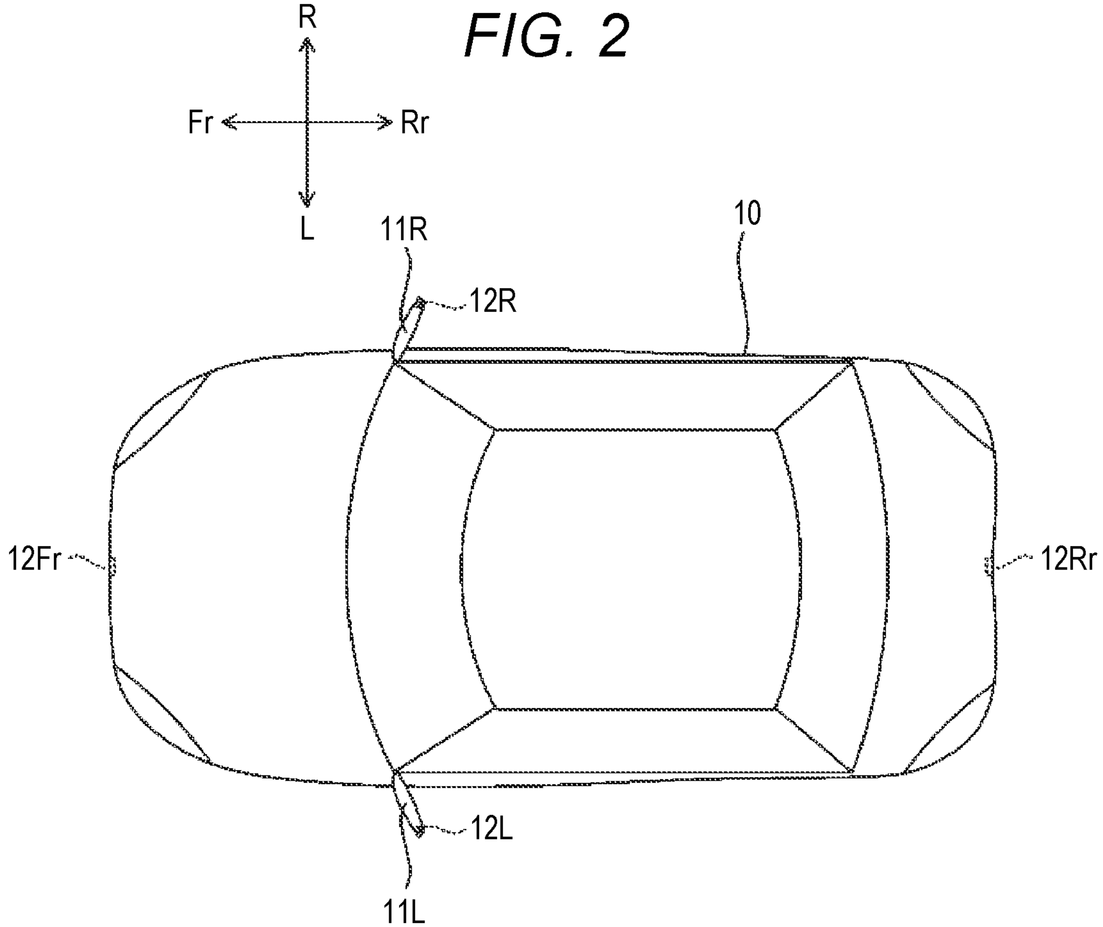
FIG. 2 is a plan view illustrating the moving object of FIG. 1.

FIGS. 1 and 2 illustrate a vehicle that is an example of a moving object.

The vehicle 10 is an automobile including a driving source (not illustrated), and wheels including drive wheels that are driven by power of the driving source and steered wheels that can be steered. In the present embodiment, the vehicle 10 is a four-wheel automobile including a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, may drive the pair of left and right rear wheels, or may drive the four wheels including the pair of left and right front wheels and the pair of left and right rear wheels. Either or both of the front wheels and the rear wheels may be steered wheels that can be steered.

The vehicle 10 further includes side mirrors 11L and 11R. The side mirrors 11L and 11R are mirrors (rearview mirrors) for allowing the user to check the rear side and the rear lateral side, and are provided outside front doors of the vehicle 10. Each of the side mirrors 11L and 11R is fixed to a main body of the vehicle 10 by a rotating shaft that extends in the perpendicular direction, and can be opened and closed by rotating around the rotating shaft.

The vehicle 10 further includes a front camera 12Fr, a rear camera 12Rr, a left side camera 12L, and a right side camera 12R. The front camera 12Fr is a camera that is provided on the front side of the vehicle 10 and images the front side of the vehicle 10. The rear camera 12Rr is a camera that is provided on the rear side of the vehicle 10 and images the rear side of the vehicle 10. The left side camera 12L is a camera that is provided on the left side mirror 11L of the vehicle 10 and images the left side of the vehicle 10. The right side camera 12R is a camera that is provided on the right side camera 11R of the vehicle 10 and images the right side of the vehicle 10. The front camera 12Fr, the rear camera 12Rr, the left side camera 12L, and the right side camera 12R are, for example, digital cameras but may be analog cameras.

Figure 3:
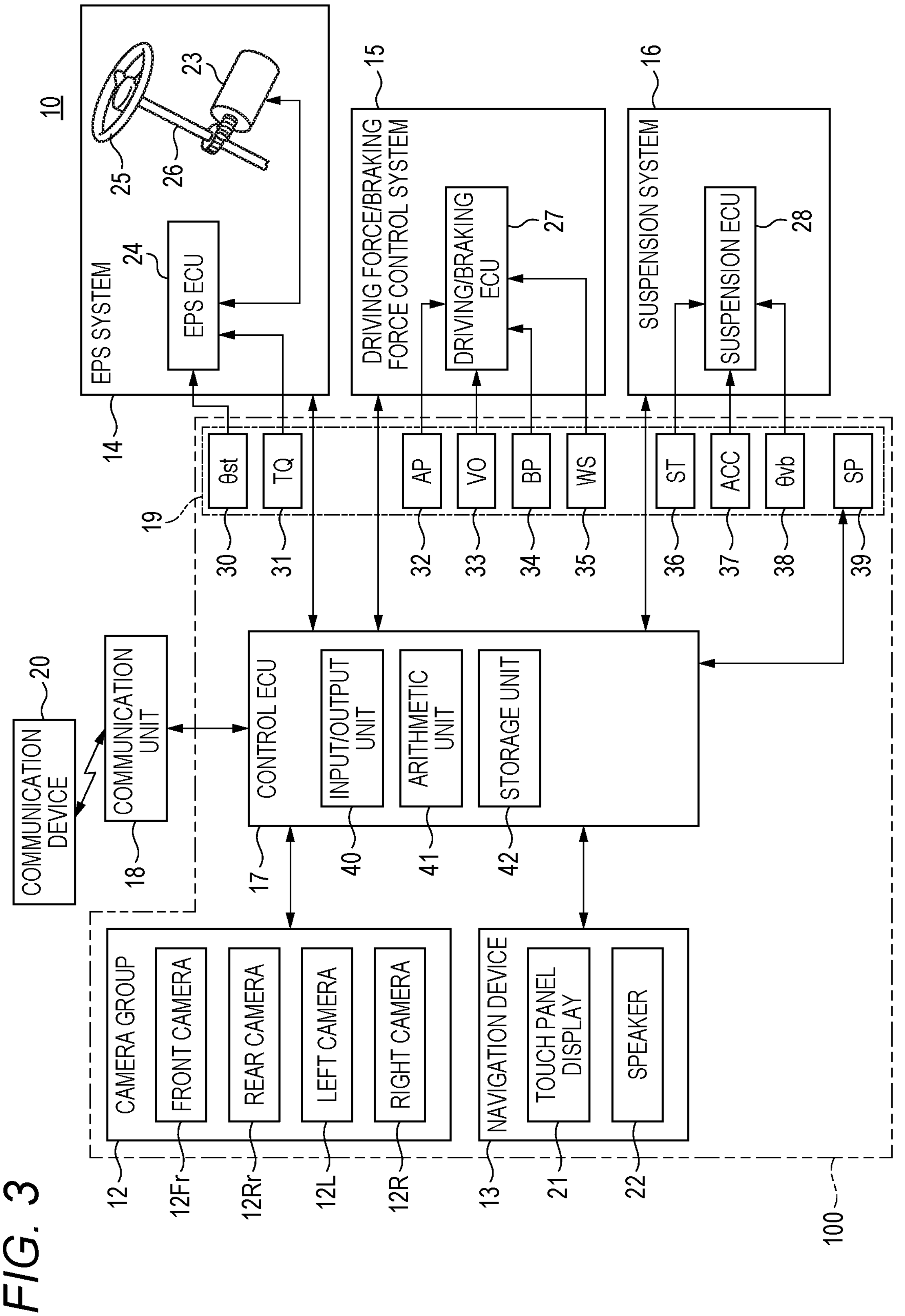
FIG. 3 is a block diagram illustrating the moving object of FIG. 1.

FIG. 3 illustrates functional blocks of the vehicle 10.

As illustrated in FIG. 3, the vehicle 10 includes a camera group 12 (the front camera 12Fr, the rear camera 12Rr, the left side camera 12L, and the right side camera 12R) and a navigation device 13. The vehicle 10 includes an electric power steering (EPS) system 14, a driving force/braking force control system 15, and a suspension system 16. The vehicle 10 includes a control electronic control unit (ECU) 17 and a communication unit 18. The vehicle 10 includes a sensor group 19. In the present embodiment, the sensor group 19 includes a steering angle sensor 30, a torque sensor 31, an accelerator sensor 32, a throttle sensor 33, a brake sensor 34, a wheel speed sensor 35, a stroke sensor 36, an acceleration sensor 37, an angular velocity sensor 38, and a shift position sensor 39.

The front camera 12Fr, the rear camera 12Rr, the left side camera 12L, and the right side camera 12R image a surrounding of the vehicle 10 and acquire image information of the surrounding of the vehicle 10. A plurality of images acquired by the front camera 12Fr, the rear camera 12Rr, the left side camera 12L, and the right side camera 12R will be referred to as a multi-view image. A bird's-eye image or a 3D image may be synthesized from the plurality of images acquired by the front camera 12Fr, the rear camera 12Rr, the left side camera 12L, and the right side camera 12R, and when the bird's-eye image or the 3D image is synthesized, the multi-view image may include the synthesized bird's-eye image or 3D image.

The navigation device 13 detects the current position of the vehicle 10, for example, using a global positioning system (GPS). The navigation device 13 includes a storage device (not illustrated) that stores a roadmap database and a road information database, and searches for a route to a destination depending on the current position of the vehicle 10. The navigation device 13 includes a touch panel display 21 and a speaker 22 to guide the searched route to passengers of the vehicle 10. The touch panel display 21 also functions as an input device of the control ECU 17.

The camera group 12 and the navigation device 13 configure an information acquisition unit configured to acquire information regarding a surrounding environment of the vehicle 10.

The steering angle sensor 30 detects a steering angle θst of a steering 25. The torque sensor 31 detects a torque TQ that is applied to the steering 25. An EPS motor 23 applies a driving force or a reaction force to a steering column 26 linked to the steering 25. An EPS system 14 includes the EPS motor 23 and an EPS ECU 24. To support the operation of the steering 25 by the user, the EPS ECU 24 drives the EPS motor 23 based on the steering angle θst detected by the steering angle sensor 30 and the torque TQ detected by the torque sensor 31. The steering angle sensor 30 and the torque sensor 31 may be integrated with the EPS system 14 or may be provided separately.

The accelerator sensor 32 detects a stepping amount AP of an accelerator pedal of the vehicle 10. The throttle sensor 33 detects an opening degree VO of a throttle valve in a fuel injection device of the vehicle 10. The brake sensor 34 detects a stepping amount BP of a brake pedal of the vehicle 10. The wheel speed sensor 35 is provided in each of the left and right front wheels and the left and right rear wheels of the vehicle 10, and detects a rotating speed WS of each of the wheels. A driving/braking ECU 27 of the driving force/braking force control system 15 controls a driving force of the vehicle 10 based on the stepping amount AP of the accelerator pedal detected by the accelerator sensor 32, the opening degree VO of the throttle valve detected by the throttle sensor 33, and the rotating speed WS of each of the wheels detected by the wheel speed sensor 35. The driving/braking ECU 27 controls a braking force of the vehicle 10 based on the stepping amount BP of the brake pedal detected by the brake sensor 34 and the rotating speed WS of each of the wheels detected by the wheel speed sensor 35. The accelerator sensor 32, the throttle sensor 33, the brake sensor 34, and the wheel speed sensor 35 may be integrated with the driving force/braking force control system 15 or may be provided separately.

The stroke sensor 36, the acceleration sensor 37, and the angular velocity sensor 38 are provided in each of the left front wheel, the right front wheel, the left rear wheel, and the right rear wheel. The stroke sensor 36 detects an extension amount ST of a suspension that supports the wheel. The acceleration sensor 37 detects accelerations ACC in the front-rear direction, the left-right direction, and the upward-downward direction that act on the wheel. The angular velocity sensor 38 detects inclinations θvb in the front-rear direction and the left-right direction of the wheel. A suspension ECU 28 of the suspension system 16 controls a hydraulic pressure of each of the suspensions to improve the steering stability of the vehicle 10 based on the extension amount ST of each of the suspensions detected by the stroke sensor 36, the accelerations ACC in the front-rear direction, the left-right direction, and the upward-downward direction detected by the acceleration sensor 37, and the inclinations θvb in the front-rear direction and the left-right direction detected by the angular velocity sensor 38.

The shift position sensor 39 detects a shift position SP, that is, to which gear a transmission of the vehicle 10 is currently set.

The sensor group 19 (the steering angle sensor 30, the torque sensor 31, the accelerator sensor 32, the throttle sensor 33, the brake sensor 34, the wheel speed sensor 35, the stroke sensor 36, the acceleration sensor 37, the angular velocity sensor 38, and the shift position sensor 39) configures a behavior acquisition unit configured to acquire behaviors during movement of the vehicle 10. In the present embodiment, various sensors in the sensor group 19 are existing sensors that are originally provided in the vehicle 10.

The communication unit 18 can execute wireless communication with another communication device 20. The other communication device 20 is, for example, a wireless communication base station or an information terminal such as a smartphone that is carried by the passenger of the vehicle 10.

The control ECU 17 includes an input/output unit 40, an arithmetic unit 41, and a storage unit 42. The arithmetic unit 41 is configured by, for example, a central processing unit (CPU). The storage unit 42 is configured by, for example, a memory such as a read only memory (ROM) or a random access memory (RAM). The arithmetic unit 41 operates based on a program stored in the storage unit 42, transmits and receives signals to and from each of the units (for example, the camera group 12, the navigation device 13, the EPS system 14, the driving force/braking force control system 15, the suspension system 16, and the communication unit 18) connected to the control ECU 17 through the input/output unit 40, and integrally controls each of the units.

An apparatus 100 for recording and/or displaying a state of the moving object is configured by the camera group 12 and the navigation device 13 as examples of the information acquisition unit, the sensor group 19 as an example of the behavior acquisition unit, and the control ECU 17 as an example of a processing circuit.

The control ECU 17 determines an environment where the vehicle 10 is positioned based on the image information acquired by the camera group 12 and position information acquired by the navigation device 13. The environment may be determined based on only the image information acquired by the camera group 12, or may be determined based on only the position information acquired by the navigation device 13. From the viewpoint of improving the determination accuracy, it is preferable that the environment is determined based on the image information and the position information.

When the determined environment is a predetermined environment and when the behavior of the vehicle 10 acquired by the sensor group 19 satisfies a predetermined condition, the control ECU 17 causes the storage unit 42 to record a state of the vehicle 10 and/or causes a display device to display a state of the vehicle 10. The display device is, for example, the touch panel display 21 of the navigation device 13 or a smartphone carried by the user of the vehicle 10.

Figure 4:
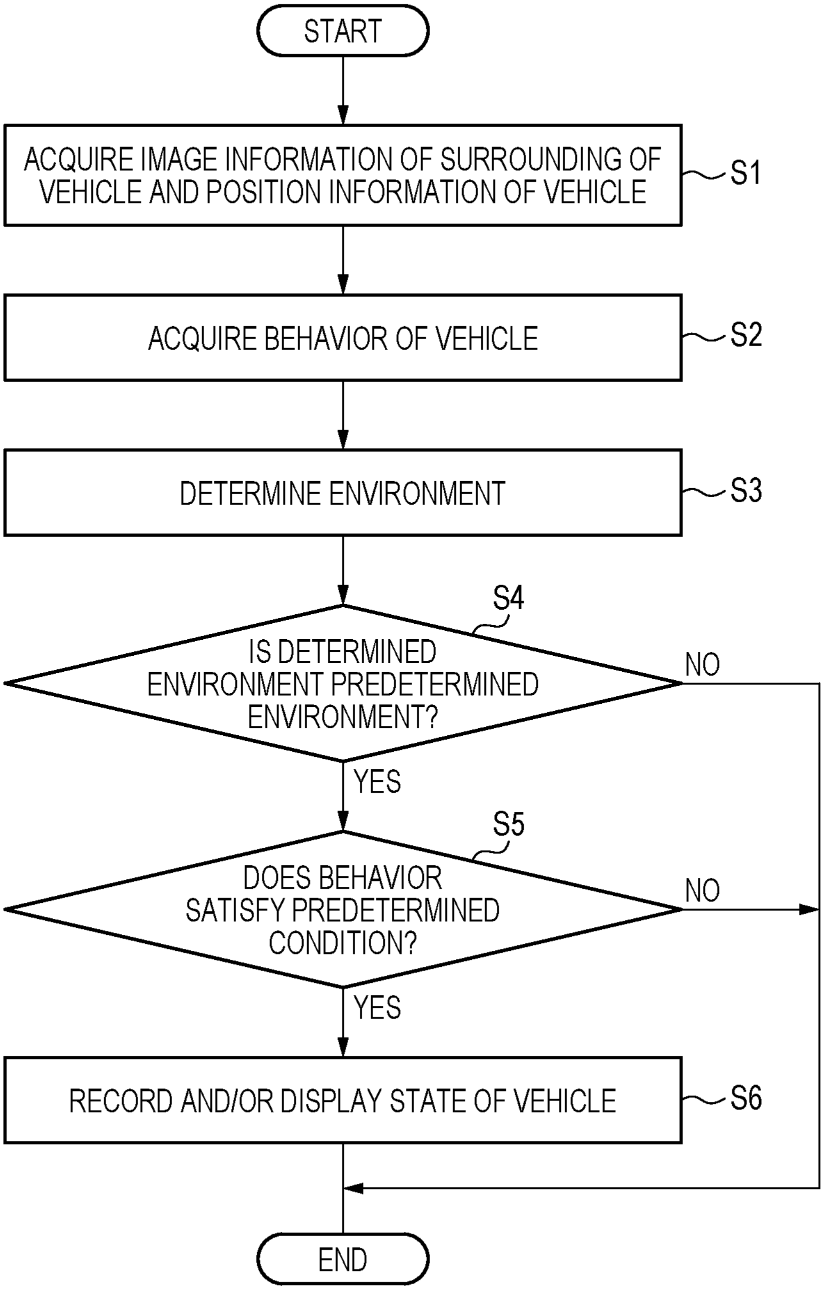
FIG. 4 is a flowchart illustrating an example of a process that is executed by a processing circuit of FIG. 3.

FIG. 4 illustrates an example of a process that is executed by the control ECU 17.

First, the control ECU 17 causes the camera group 12 to acquire the image information of the surrounding of the vehicle 10, and causes the navigation device 13 to acquire the position information of the vehicle 10 (Step S1). The control ECU 17 causes the sensor group 19 to acquire the behavior of the vehicle 10 (Step S2). The control ECU 17 determines the environment where the vehicle 10 is positioned based on the acquired image information and position information (Step S3).

Examples of the environment determined by the control ECU 17 include not only an urban area or a highway that is typically assumed as an environment where the vehicle 10 travels, but also an off-road, a forest road, a rocky area, a sandy beach, or a waterfront where the vehicle 10 travels at a lower frequency than in an urban area or a highway. For example, regarding the determination of an off-road, the control ECU 17 can identify whether the road where the vehicle 10 travels is a paved road based on the image information, and when the road is an unpaved road, the control ECU 17 can determine that the environment is an off-road. The control ECU 17 can identify whether the road where the vehicle 10 travels is registered in the roadmap database based on the position information, and when the road is not registered, the control ECU 17 can also determine that the road is an off-road. When the road where the vehicle 10 travels is registered in the roadmap database and when the road is unpaved in the road information database, the control ECU 17 can also determine that the road is an off-road.

Next, the control ECU 17 determines whether the determined environment is a predetermined environment (Step S4). The predetermined environment is not particularly limited and is, for example, an environment such as an off-road, a forest road, a rocky area, sandy beach, or a waterfront where traveling frequency is generally low and is preset in the storage unit 42. When the vehicle 10 travels in the environment where the traveling frequency is generally low, the intention of the user of the vehicle 10 can be inferred, and it can be said that the environment is an environment of interest to the user. As the predetermined environment, a plurality of environments may be set. When a plurality of environments are set as the predetermined environment, the determined environment only needs to match with any one of the predetermined environments.

When the determined environment is not the predetermined environment (Step S4—No), the control ECU 17 ends the process. On the other hand, when the determined environment is the predetermined environment (Step S4—Yes), the control ECU 17 determines whether the behavior of the vehicle 10 acquired by the sensor group 19 satisfies a predetermined condition (Step S5).

The predetermined condition is set, for example, to detect an irregular situation that may occur in an environment where a traveling condition is poor. During traveling in an environment such as an off-road, a forest road, a rocky area, sandy beach, or a waterfront where the traveling frequency is generally low, the traveling condition is poorer than that during traveling in an urban area or a highway such that an irregular situation is likely to occur. For a person who voluntarily travels in such environment, the occurrence of an irregular situation is rather expected. Accordingly, it can be said that the record and/or display of the state of the vehicle 10 in the irregular situation is a matter of interest to the user of the vehicle 10.

As the predetermined conditions for detecting the irregular situation, for example, the following (A) to (I) can be used. The predetermined conditions are preset by the control unit 42.

(A) A difference between rotating speeds of the left and right wheels of the vehicle 10 exceeds a threshold.

(B) Pitching or movement in the front-rear direction of the vehicle 10 is repeated a predetermined number of times or more within a predetermined period.

(C) Yawing of the vehicle 10 is repeated a predetermined number of times or more within a predetermined period.

(D) An acceleration operation and a braking operation of the vehicle 10 are repeated a predetermined number of times or more within a predetermined period.

(E) An operation amount of the acceleration operation and/or an operation amount of the braking operation of the vehicle 10 exceeds a threshold.

(F) The extension amount of the suspension of the vehicle 10 exceeds a threshold continuously for a predetermined period.

(G) One of the left and right suspensions of the vehicle 10 is more compressed than the other of the left and right suspensions continuously for a predetermined time.

(H) An inclination in the front-rear direction of the vehicle 10 exceeds a threshold.

(I) An inclination in the left-right direction of the vehicle 10 exceeds a threshold.

In (A) described above, for example, a situation where one of the left and right wheels of the vehicle 10 slips is assumed. The difference between the rotating speeds of the left and right wheels of the vehicle 10 can be detected by the wheel speed sensor 35.

In (B) described above, the movement in the front-rear direction of the vehicle 10 is repeated. In (C) described above, the movement in the left-right direction of the vehicle 10 is repeated. In either case, for example, a situation where the vehicle 10 is stuck and a small movement is repeated to exit from the stuck state is assumed. The pitching of the vehicle 10 can be detected by the wheel speed sensor 35 and the acceleration sensor 37 or by the shift position sensor 39 and the acceleration sensor 37. The yawing of the vehicle 10 can be detected by the steering angle sensor 30 and the acceleration sensor 37.

In (D) described above, a situation where the acceleration operation and the braking operation are frequently executed and the vehicle 10 travels in, for example, a severely corrugated road is assumed. In (E) described above, a situation where rapid acceleration or rapid deceleration is executed and the vehicle 10 enters, for example, a steep road is assumed. The acceleration operation and the operation amount thereof can be detected by the accelerator sensor 32 and/or the throttle sensor 33. The braking operation can be detected by the brake sensor 34.

In (F) described above, a situation where the wheel of the vehicle 10 floats from a road surface is assumed. In (G) described above, a situation where one of the left and right wheels of the vehicle 10 runs on to a height is assumed. The extension or compression of the suspension of the vehicle 10 can be detected by the stroke sensor 36.

In (H) described above, a situation where the vehicle 10 travels in a steep road is assumed. In (I) described above, a situation where one of the left and right wheels runs on to a height higher than the other wheel is assumed. The inclinations in the front-rear direction and the left-right direction of the vehicle 10 can be detected by the angular velocity sensor 38.

When the behavior of the vehicle 10 does not satisfy the predetermined condition (Step S5—NO), the control ECU 17 ends the process. When the behavior of the vehicle 10 satisfies the predetermined condition (Step S5—Yes), the control ECU 17 causes the storage unit 42 to record the state of the vehicle 10 and/or causes the display device (for example, the touch panel display 21) to display the state of the vehicle 10 (Step S6). The control ECU 17 repeatedly executes the process described above at regular intervals.

The recorded and/or displayed state of the vehicle 10 may include the image information of the surrounding of the vehicle 10 acquired by the camera group 12. The image information can efficiently and effectively record and/or display the state of the vehicle 10, and thus is suitable for checking the state of the vehicle 10. The image information also has high affinity to a social network service (SNS) and is also suitable for sharing with other people through the SNS.

The recorded and/or displayed state of the vehicle 10 may include the determined environment in Step S4. The environment can be used for tagging with, for example, the image information acquired by the camera group 12, and the search of the image information by tagging is simple. The recorded and/or displayed state of the vehicle 10 may include the behavior of the vehicle 10 detected in Step S5. For example, the behavior of the vehicle 10 can be analyzed to improve the driving skill of the user of the vehicle 10.

The recorded and/or displayed state of the vehicle 10 may be a state after a timing at which the behavior of the vehicle 10 is determined to satisfy the predetermined condition, but is preferably a state in a predetermined period (for example for around 30 seconds) around the timing at which the behavior of the vehicle 10 is determined to satisfy the predetermined condition.

As described above, in the apparatus 100 for recording and/or display the state of the moving object, the record and/or display of the state of the vehicle 10 can be controlled based on the environment where the vehicle 10 is positioned and the behavior of the vehicle 10. As a result, the state of the vehicle 10 of interest to the user can be automatically recorded and/or displayed.

In the apparatus 100 described above, the predetermined environment and the predetermined condition may be customized by the user of the vehicle 10. As a result, the state of the vehicle 10 of interest to the user can be more reliably recorded and/or displayed. The customization of the predetermined environment and the predetermined condition by the user of the vehicle 10 is executed, for example, by input to the touch panel display 21 of the navigation device 13 or by input to a smartphone carried by the user. The predetermined environment and the predetermined condition set by the user of the vehicle 10 are stored in the storage unit 42 of the control ECU 17.

When the predetermined environment and the predetermined condition customized by the user are not stored in the storage unit 42 of the control ECU 17, the control ECU 17 may be configured not to record and/or display the state of the vehicle 10. Conversely, only when the predetermined environment and the predetermined condition customized by the user are stored in the storage unit 42, the control ECU 17 may be configured to execute the processes of Step S1 to Step S6 illustrated in FIG. 4. As a result, the state of the vehicle 10 of interest to the user can be more reliably recorded and/or displayed.

Figure 5:
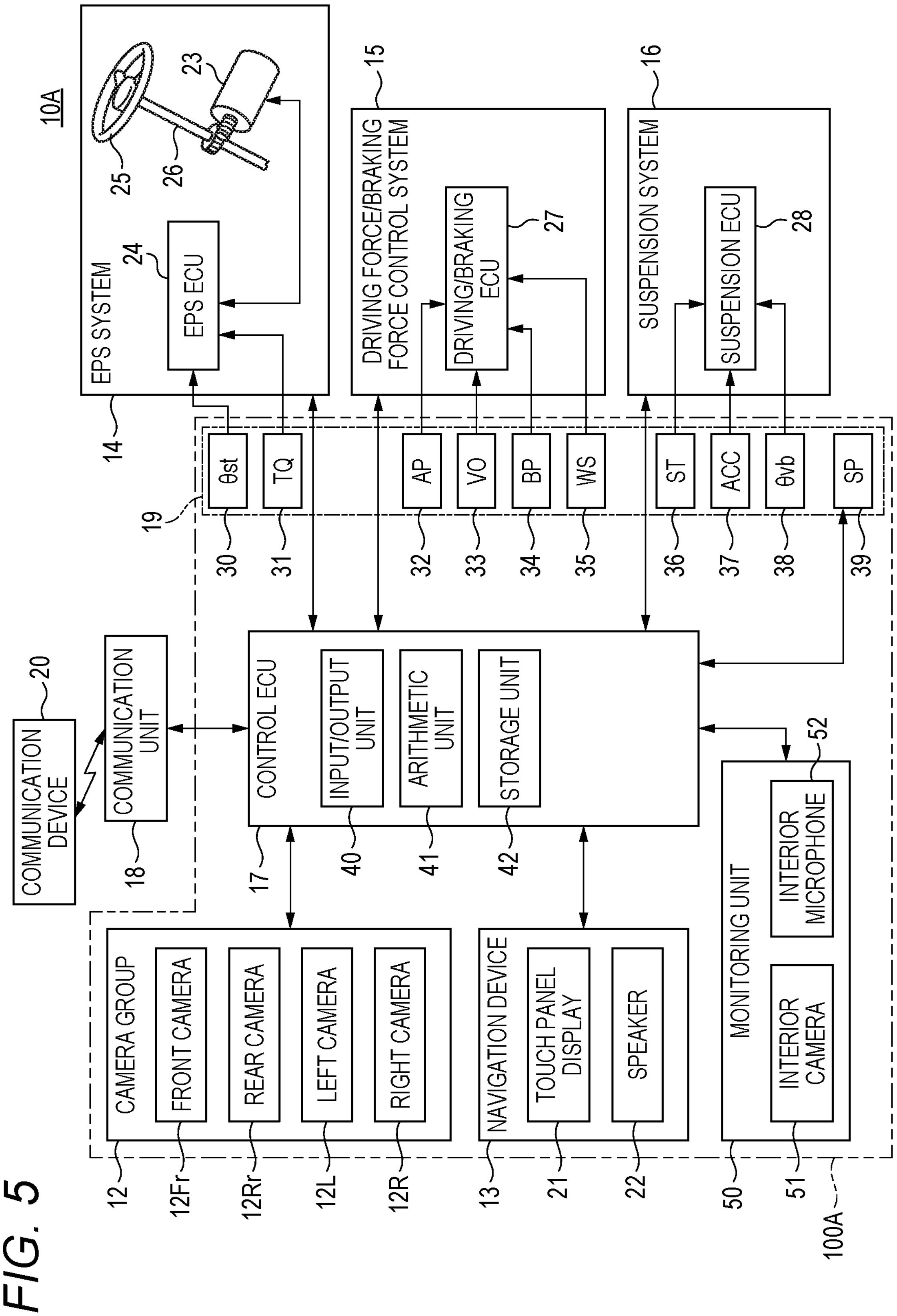
FIG. 5 is a block diagram illustrating another example of the moving object.

FIG. 5 illustrates functional blocks of another example of the moving object.

A vehicle 10A that is an example of the moving object illustrated in FIG. 5 includes the camera group 12, the navigation device 13, the EPS system 14, the driving force/braking force control system 15, the suspension system 16, the control ECU 17, the communication unit 18, and the sensor group 19. The vehicle 10A further includes a monitoring unit 50 that monitors a state of a user of the vehicle 10A. An apparatus 100A for recording and/or displaying a state of the moving object is configured by the camera group 12 and the navigation device 13 as examples of the information acquisition unit, the sensor group 19 as an example of the behavior acquisition unit, the control ECU 17 as an example of the processing circuit, and the monitoring unit 50.

The control ECU 17 determines an environment where the vehicle 10A is positioned based on the image information acquired by the camera group 12 and the position information acquired by the navigation device 13. When the determined environment is a predetermined environment and when the behavior of the vehicle 10A acquired by the sensor group 19 satisfies a predetermined condition, the control ECU 17 causes the storage unit 42 to record a state of the vehicle 10A and/or causes the display device to display a state of the vehicle 10A.

The control ECU 17 further evaluates a degree of interest of the user based on the state of the user acquired by the monitoring unit 50. The control ECU 17 accumulates an environment and a behavior where the evaluation of the degree of interest of the user is high in the storage unit 42 as the predetermined environment and the predetermined condition customized by the user.

The monitoring unit 50 includes an interior camera 51 that acquires image information in a passenger compartment of the vehicle 10A, and an interior microphone 52 that acquires sound information in the passenger compartment of the vehicle 10A. Examples of a method of evaluating the degree of interest of the user from the image information acquired by the interior camera 51 include a method of estimating emotion from a facial expression of the user by image analysis using machine learning and a method of detecting a change in the body temperature of the user. Examples of a method of evaluating the degree of interest of the user from the sound information acquired by the interior microphone 52 include a method of estimating emotion from a voice tone of the user by sound analysis using machine learning.

In the apparatus 100A, an environment and a behavior where the evaluation of the degree of interest of the user is high are automatically collected and accumulated in the storage unit 42. The state of the vehicle 10A is recorded and/or displayed based on the predetermined environment and the predetermined condition accumulated in the storage unit 42. As a result, the state of the vehicle 10A of interest to the user can be more reliably recorded and/or displayed.

As the recorded and/or displayed state of the vehicle 10A, the image information in the passenger compartment acquired by the interior camera 51 of the monitoring unit 50 or the sound information in the passenger compartment acquired by the interior microphone 52 may be included.

In the apparatus 100 or 100A described above, the control ECU 17 determines the environment where the vehicle 10 or 10A is positioned based on the image information and/or the position information. However, information for determining the environment is not limited to the image information and/or the position information. For example, in the determination of whether the environment where the vehicle 10 or 10A is positioned is an off-road, the control ECU 17 may determine whether the environment where the vehicle 10 or 10A is positioned is an off-road based on information such as information that the display device executes a display for an off-road based on selection of the user and a mode of the driving/braking ECU 27 is set to a mode for off-road driving based on selection of the user.

Figure 6:
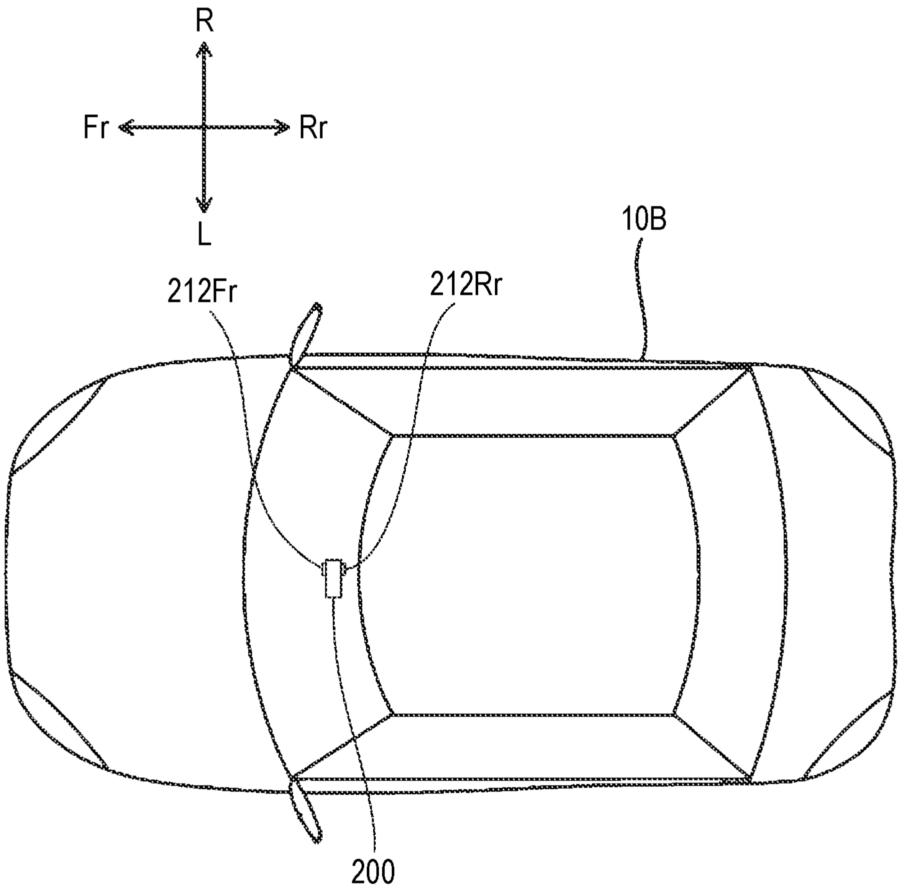
FIG. 6 is a plan view illustrating another example of an apparatus for recording and/or displaying a state of a moving object.
Figure 7:
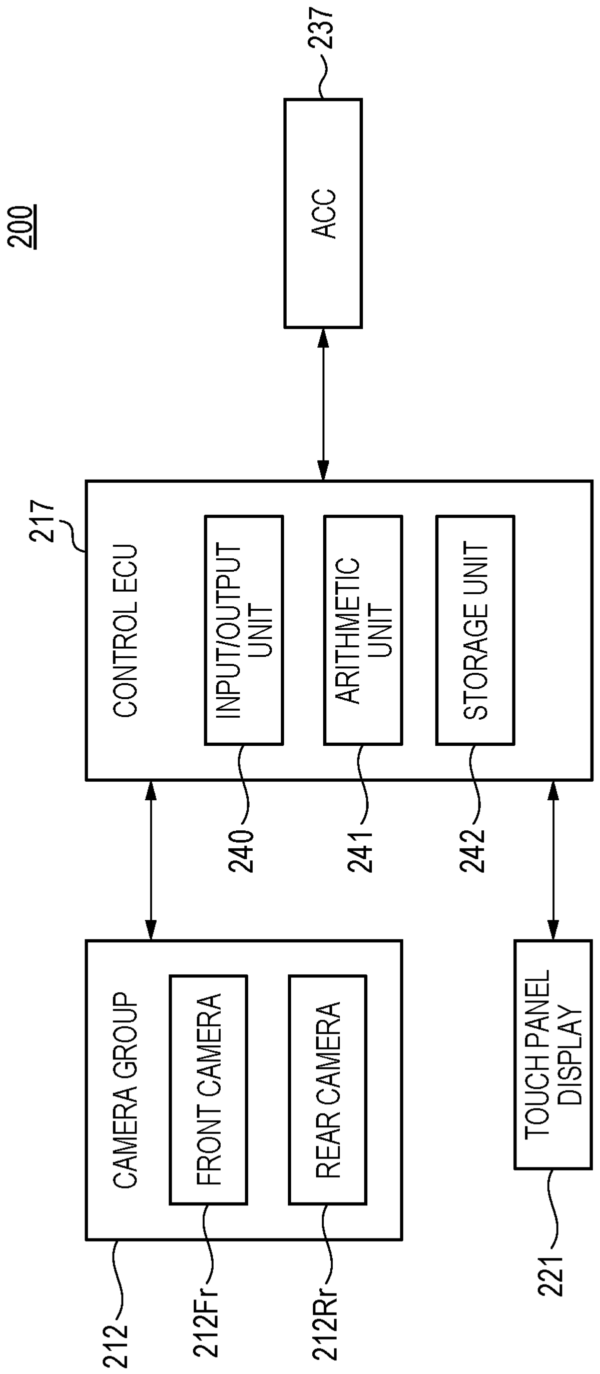
FIG. 7 is a block diagram illustrating the apparatus of FIG. 6.

FIGS. 6 and 7 illustrate another example of an apparatus for recording and/or display a state of the moving object.

All of the camera group 12, the navigation device 13, the sensor group 19, and the control ECU 17 configuring the apparatus 100 described above are existing equipment of the vehicle 10. However, the apparatus for recording and/or displaying the state of the moving object may be attached afterward to the moving object.

A vehicle 10B that is an example of the moving object is a four-wheel automobile. An apparatus 200 for recording and/or displaying a state of the vehicle 10B is an on-board unit that is attached afterward to the vehicle 10B and is attached to a vehicle interior surface of a windshield of the vehicle 10B.

The apparatus 200 includes a camera group 212 that includes a front camera 212Fr and a rear camera 212Rr, a touch panel display 221, an acceleration sensor 237, and a control ECU 217. The camera group 212 is not limited to two cameras including the front camera 212Fr and the rear camera 212Rr. The camera group 212 may be configured by one camera or may be configured by three or more cameras. The attachment position of the apparatus 200 is not limited to the windshield. For example, considering the field of view of the camera in the camera group 212, the apparatus 200 may be attached to an appropriate position.

The front camera 212Fr images the front side of the vehicle 10B through the windshield of the vehicle 10B. The rear camera 212Rr images the rear side of the vehicle 10B through a rear glass of the vehicle 10B. The touch panel display 221 displays image information acquired by the camera group 212. The touch panel display 221 also functions as an input device of the control ECU 217. The acceleration sensor 237 detects accelerations ACC in the front-rear direction, the left-right direction, and the upward-downward direction that act on the vehicle 10B.

The control ECU 217 includes an input/output unit 240, an arithmetic unit 241, and a storage unit 242. The arithmetic unit 241 is configured by, for example, a CPU. The storage unit 242 is configured by, for example, a memory such as a ROM or a RAM. The arithmetic unit 241 operates based on a program stored in the storage unit 242, transmits and receives signals to and from the camera group 212, the acceleration sensor 237, and the touch panel display 221, and integrally controls each of the units.

The control ECU 217 determines an environment where the vehicle 10B is positioned based on the image information acquired by the camera group 212. When the determined environment is a predetermined environment and when the behavior of the vehicle 10B acquired by the acceleration sensor 237 satisfies a predetermined condition, the control ECU 217 causes the storage unit 242 to record the state of the vehicle 10B and/or causes the touch panel display 221 to display the state of the vehicle 10B.

Figure 8:
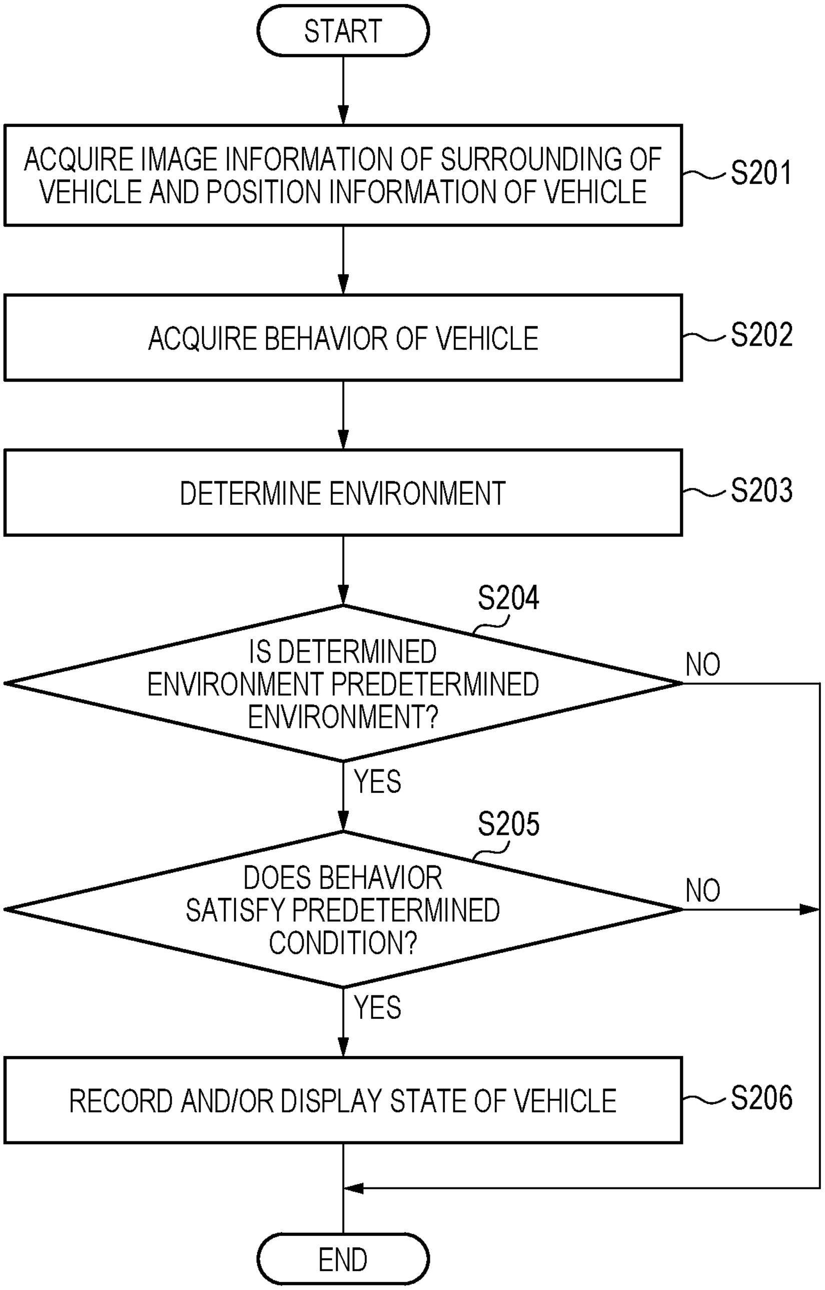
FIG. 8 is a flowchart illustrating an example of a process that is executed by a processing circuit of the apparatus of FIG. 7.

FIG. 8 illustrates an example of the process that is executed by the control ECU 217.

First, the control ECU 217 causes the camera group 212 to acquire the image information of the surrounding of the vehicle 10B (Step S201). The control ECU 217 causes the acceleration sensor 237 to acquire the behavior of the vehicle 10 (Step S202). The control ECU 217 determines the environment where the vehicle 10B is positioned based on the acquired image information (Step S203).

Examples of the environment determined by the control ECU 217 include not only an urban area or a highway that is typically assumed as an environment where the vehicle 10B travels, but also an off-road, a forest road, a rocky area, a sandy beach, or a waterfront where the vehicle 10B travels at a lower frequency than in an urban area or a highway. For example, regarding the determination of an off-road, the control ECU 217 can identify whether the road where the vehicle 10B travels is a paved road based on the image information, and when the road is an unpaved road, the control ECU 217 can determine the environment is an off-road.

Next, the control ECU 217 determines whether the determined environment is a predetermined environment (Step S204). The predetermined environment is not particularly limited and is, for example, the environment such as an off-road, a forest road, a rocky area, sandy beach, or a waterfront where traveling frequency is generally low, is an environment where the traveling condition is poorer than that during traveling in an urban area or a highway, and is preset in the storage unit 242.

When the determined environment is not the predetermined environment (Step S204—No), the control ECU 217 ends the process. On the other hand, when the determined environment is the predetermined environment (Step S204—Yes), the control ECU 217 determines whether the behavior of the vehicle 10 acquired by the acceleration sensor 237 satisfies a predetermined condition (Step S205).

The predetermined condition is set, for example, to detect an irregular situation that may occur in an environment where a traveling condition is poor. One example of the predetermined condition is that an impact exceeding a threshold acts on the vehicle 10B, and the impact that acts on the vehicle 10B can be detected by the acceleration sensor 237.

When the behavior of the vehicle 10B does not satisfy the predetermined condition (Step S205—No), the control ECU 217 ends the process. When the behavior of the vehicle 10B satisfies the predetermined condition (Step S205—Yes), the control ECU 217 causes the storage unit 242 to record the state of the vehicle 10B and/or causes the display device (for example, the touch panel display 221) to display the state of the vehicle 10B (Step S206). The control ECU 217 repeatedly executes the process described above at regular intervals.

In the apparatus 200 for recording and/or display the state of the moving object, the record and/or display of the state of the vehicle 10B can be controlled based on the environment where the vehicle 10B is positioned and the behavior of the vehicle 10B. As a result, the state of the vehicle 10B of interest to the user can be automatically recorded and/or displayed.

The predetermined condition may be changed depending on the environment determined in Step S203. For example, when the predetermined condition is that an impact exceeding a threshold acts on the vehicle 10B, the threshold regarding the impact may be changed depending on the determined environment. As such, by changing the predetermined condition depending on the environment, the use of the apparatus 200 for recording and/or displaying the state of the moving object can be widened.

For example, when the environment is an urban area or a highway, a first threshold is used, and when the environment is an environment such as an off-road, a forest road, a rocky area, sandy beach, or a waterfront where traveling frequency is generally low and is an environment where the traveling condition is poorer than that during traveling in an urban area or a highway, a second threshold is used. As a result, in an urban area or a highway, the apparatus 200 can be used as an impact-detection type drive recorder for recording a video when an accident occurs. In the predetermined environment such as an off-road, the apparatus 200 can be used as an apparatus for automatically recording and/or displaying the state of the vehicle 10B of interest to the user. The first threshold and the second threshold are appropriately set depending on an event that is assumed in the corresponding environment.

The apparatus 200 is an on-board unit that is attached afterward (additionally provided) to the vehicle 10B, and the functions of the apparatus 200 including the function of changing the predetermined condition depending on the environment may be implemented by existing equipment of the vehicle as in the apparatus 100 or 100A.

What is claimed is:

1. An apparatus for recording a state of a moving object, the apparatus comprising:
- a camera configured to acquire information regarding a surrounding environment of the moving object, the information including an image of surroundings of the moving object;
- at least one sensor configured to acquire a behavior during movement of the moving object; and
- a processing circuit, wherein
- the processing circuit is configured to
  - determine an environment where the moving object is positioned based on the information acquired by the camera,
  - control a memory to record the state of the moving object in response to the determined environment is a predetermined environment and the behavior acquired by the at least one sensor satisfies a predetermined condition,
- the processing circuit is further configured to identify whether a road where the moving object is traveling is an unpaved road based on the image acquired by the camera,
- the processing circuit determines the environment as the predetermined environment when identifying the road is the unpaved road,
- the processing circuit controls the memory to record the image acquired by the camera as the record of the state of the moving object in response to the determined environment being the predetermined environment and the behavior acquired by the at least one sensor satisfying the predetermined condition, and
- the processing circuit is further configured to
  - evaluate a degree of interest of a user in the environment and the behavior with image analysis using machine learning of an image in a passenger compartment of the moving object acquired by an interior camera, or with sound analysis using machine learning of a sound in the passenger compartment of the moving object acquired by an interior microphone, and
  - automatically set the predetermined environment and the predetermined condition for the behavior based on the evaluated degree of interest.

2. The apparatus according to claim 1, wherein
- the information further includes position information of the moving object.

3. The apparatus according to claim 2, further comprising a plurality of the cameras, wherein the plurality of cameras acquire a multi-view image as the image on the surrounding of the moving object.

4. The apparatus according to claim 1, wherein
- the processing circuit further records at least one of the determined environment and the behavior acquired by the at least one sensor as the record of the state of the moving object.

5. The apparatus according to claim 1, wherein
- the processing circuit records the state of the moving object over a predetermined period around a timing at which the behavior acquired by the at least one sensor is determined to satisfy the predetermined condition.

6. The apparatus according to claim 1, wherein
- the processing circuit includes a memory that stores a customized environment customized by a user of the moving object regarding the environment where the moving object is positioned and a customized behavior customized by the user regarding the behavior during the movement of the moving object,
- the predetermined environment is the customized environment stored in the memory, and
- the predetermined condition is the customized behavior stored in the memory.

7. The apparatus according to claim 6, wherein
- when at least one of the customized environment and the customized behavior is not stored in the memory, the processing circuit is configured not to record the state of the moving object.

8. The apparatus according to claim 1, wherein
- the at least one sensor is an existing sensor of the moving object.

9. The apparatus according to claim 1, wherein
- the predetermined condition is that a difference between rotating speeds of left and right wheels of the moving object exceeds a threshold.

10. The apparatus according to claim 1, wherein
- the predetermined condition is that pitching or movement in a front-rear direction of the moving object is repeated a predetermined number of times or more within a predetermined period.

11. The apparatus according to claim 1, wherein
- the predetermined condition is that yawing of the moving object is repeated a predetermined number of times or more within a predetermined period.

12. The apparatus according to claim 1, wherein the predetermined condition is that an acceleration operation and a braking operation of the moving object are repeated a predetermined number of times or more within a predetermined period.

13. The apparatus according to claim 1, wherein the predetermined condition is that an operation amount of an acceleration operation and/or an operation amount of a braking operation of the moving object exceeds a threshold.

14. The apparatus according to claim 1, wherein the predetermined condition is that an extension amount of a suspension of the moving object exceeds a threshold continuously for a predetermined period.

15. The apparatus according to claim 1, wherein the predetermined condition is that one of left and right suspensions of the moving object is more compressed than another of the left and right suspensions continuously for a predetermined time.

16. The apparatus according to claim 1, wherein the predetermined condition is that an inclination in a front-rear direction of the moving object exceeds a threshold.

17. The apparatus according to claim 1, wherein the predetermined condition is that an inclination in a left-right direction of the moving object exceeds a threshold.

18. The apparatus according to claim 1, wherein the processing circuit changes the predetermined condition depending on the determined environment.

* * * * *